(12) United States Patent
Yamaguchi

(10) Patent No.: US 8,422,091 B2
(45) Date of Patent: Apr. 16, 2013

(54) IMAGE READING APPARATUS, IMAGE DATA OUTPUT PROCESSING APPARATUS, AND IMAGE READING METHOD

(75) Inventor: Michiko Yamaguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 237 days.

(21) Appl. No.: 13/089,990

(22) Filed: Apr. 19, 2011

(65) Prior Publication Data

US 2011/0261425 A1 Oct. 27, 2011

(30) Foreign Application Priority Data

Apr. 26, 2010 (JP) ................................. 2010-101229

(51) Int. Cl.
*H04N 1/04* (2006.01)
(52) U.S. Cl.
USPC ........... 358/474; 358/512; 358/475; 358/516; 382/274; 382/275; 382/264
(58) Field of Classification Search ............... 358/474, 358/512, 515, 516, 518, 509, 475, 501, 505, 358/520; 382/274, 275, 264, 167, 162, 172
See application file for complete search history.

(56) References Cited

U.S. PATENT DOCUMENTS

| | | | | |
|---|---|---|---|---|
| 4,646,144 A * | 2/1987 | Ishida et al. | ................. | 358/517 |
| 4,933,983 A | 6/1990 | Hiramatsu et al. | | |
| 5,724,152 A * | 3/1998 | Hayashi et al. | ................. | 358/296 |
| 5,771,315 A * | 6/1998 | Matsuyama | ................. | 382/191 |
| 6,700,679 B1 * | 3/2004 | Fujita et al. | ................. | 358/1.9 |
| 6,972,877 B1 * | 12/2005 | Nakamura | ................. | 358/474 |
| 7,260,280 B2 * | 8/2007 | Ichioka et al. | ................. | 385/8 |
| 7,505,179 B2 * | 3/2009 | Matsunoshita et al. | ...... | 358/3.28 |
| 7,572,009 B2 * | 8/2009 | Suzuki | ................. | 351/206 |
| 7,602,987 B2 * | 10/2009 | Kuramoto | ................. | 382/254 |
| 7,773,136 B2 * | 8/2010 | Ohyama et al. | ................. | 348/276 |

FOREIGN PATENT DOCUMENTS

| | | |
|---|---|---|
| JP | 62-188951 A | 8/1987 |
| JP | 5-162294 A | 6/1993 |
| JP | 7-23176 A | 1/1995 |
| JP | 2001-69354 A | 3/2001 |
| JP | 2007-43427 A | 2/2007 |
| JP | 2011-193404 A | 9/2011 |

* cited by examiner

*Primary Examiner* — Negussie Worku

(74) *Attorney, Agent, or Firm* — Birch, Stewart, Kolasch & Birch, LLP

(57) ABSTRACT

Carried out are (i) an infrared light scanning process in which light is directed to a document in a state in which a visible light cut filter is provided in an optical path, in which the light is directed from a light source to the document, reflected from the document, and then received by a light receiving element, so that the light receiving element receives the reflected light from the document and prepares image data S1; (ii) a visible light scanning process in which the light is directed to the document in a state in which no visible light cut filter is provided in the optical path, so that the light receiving element receives the reflected light from the document and prepares image data S2; and (iii) a color correction process in which a color of an image in the image data S2 is corrected in accordance with the image data S1 so that an influence of light having a infrared wavelength is removed or reduced from the image data S2. According to this, regardless of document paper types, document image data whose color tone is closer to a document color tone sensed by human eyes.

7 Claims, 6 Drawing Sheets

IMAGE READING APPARATUS, IMAGE DATA OUTPUT PROCESSING APPARATUS, AND IMAGE READING METHOD

This Nonprovisional application claims priority under 35 U.S.C. §119(a) on Patent Application No. 2010-101229 filed in Japan on Apr. 26, 2010, the entire contents of which are hereby incorporated by reference.

TECHNICAL FIELD

The present invention relates to an image reading apparatus and an image scanning method in each of which a document is read (scanned) so as to prepare image data for the document.

BACKGROUND ART

There is a conventionally suggested technique carried out in an image reading apparatus in which a document is read so as to prepare image data for the document. According to the technique, the document is subjected to pre-scanning before being subjected to final scanning for preparing the image data of the document, so that (i) what is to be processed in the final scanning and (ii) what image processing is to be carried out with respect to the read image data are controlled in accordance with a result of the pre-scanning.

Patent Literature 1 describes a technique carried out in an inspection apparatus for inspecting a printing quality of a printed matter which is subjected to planographic printing and intaglio printing. According to the technique, in order that, in a case where an intaglio printing pattern is printed to be more or less displaced but there is no missing part or excess ink stain in the intaglio printing pattern, it is determined that the printed matter is normal, only light in a near-infrared region is extracted from light directed from a light source to the printed matter and then reflected from the printed matter. The extraction makes it possible to obtain information on the near-infrared region and to compare the intaglio printing pattern with a preliminarily prepared reference pattern for a normal printed matter. The printing quality is thus inspected with the planographic printing ignored.

CITATION LIST

Patent Literature 1

Japanese Patent Application Publication, Tokukaihei, No. 5-162294 A (Publication Date: Jun. 29, 1993)

SUMMARY OF INVENTION

Technical Problem

According to a conventional image reading apparatus, document image data obtained by reading documents whose color tones are seemingly identical may have different color tones depending on document paper types. FIG. 5 is a graph illustrating RGB signal values obtained in a case where two documents (i) on which images that look substantially identical to human eyes are formed and (ii) whose paper types are different are read by a single image reading apparatus.

The inventors of the present invention examined the reason why such a problem occurs. As a result, they found the reason is that a light receiving element provided in an image reading apparatus has a light receiving sensitivity to a near-infrared wavelength region (which is a wavelength region that (i) covers (a) an infrared wavelength region and (b) a boundary region between the infrared wavelength region and a visible wavelength region and (ii) is invisible or hardly visible to human eyes).

This point is to be described with reference to FIGS. 6(a) and 6(b). FIG. 6(a) is a graph illustrating spectral sensitivity characteristics of CCD elements which are provided in an image reading apparatus as light receiving elements and correspond to respective colors of R (red), G (green), and B (blue). A vertical axis represents a light receiving intensity of a CCD element for each wavelength. Note that in FIG. 6(a), the light receiving intensity is represented assuming that each wavelength of light directed to a document has an intensity of 1. A horizontal axis represents a wavelength. FIG. 6(b) is a graph illustrating an amount of light (near-infrared light) received by a light receiving element in a case where light is reflected from each of two documents whose paper types are different (described earlier) and then enters the light receiving element via a visible light cut filter (note that this graph is not a publicly-known graph but was prepared in accordance with the result of the examination by the inventors of the present invention). The CCD elements corresponding to the respective colors of RGB not only have their respective peak light receiving sensitivities in wavelength regions corresponding to the respective colors but also have their respective light receiving sensitivities also in the near-infrared wavelength region (see FIG. 6(a)). In particular, the CCD element corresponding to R has a higher light receiving sensitivity in the near-infrared wavelength region than the CCD elements corresponding to G and B.

Reflection/absorption characteristics to light in the near-infrared wavelength region vary depending on each paper type (e.g., each characteristic such as a brilliance). Therefore, in a case where light having a wavelength in the near-infrared wavelength region is directed to paper, light (near-infrared light) in the near-infrared wavelength region which light is reflected from the paper has different intensities depending on each paper type.

Given these circumstances, document image data obtained by reading documents whose color tones look identical to human eyes may have different color tones depending on document paper types.

In order to solve the problem, it is assumed that an infrared filter for blocking light in the near-infrared wavelength region is provided in an optical path in which light is directed from a light source to a document, reflected from the document, and then received by a light receiving element (note that such an arrangement is not a publicly-known arrangement but was set by the inventors of the present invention). However, according to such an arrangement, it is difficult for the infrared filter to perfectly block only the light in the near-infrared wavelength region without blocking light in the visible wavelength region. Therefore, it is impossible to remove only an influence of the light in the near-infrared wavelength region without the fear of causing a deterioration in image quality.

It is also assumed that a light receiving element (an Ir light receiving element) for receiving the light in the near-infrared wavelength region is provided separately from RGB light receiving elements, so that light receiving results obtained by the RGB light receiving elements are corrected in accordance with a light receiving result obtained by the Ir light receiving element (note that such an arrangement is not a publicly-known arrangement but was set by the inventors of the present invention). However, according to such an arrangement, the Ir light receiving element and each of the RGB light receiving elements have different light sensitivities to the light in the near-infrared wavelength region. Therefore, it is impossible to accurately correct the light receiving results obtained by the RGB light receiving elements. In addition, according to such an arrangement, the Ir light receiving element needs to be provided separately from the RGB light receiving elements. This may cause a decrease in reading resolution and an increase in apparatus cost.

The present invention has been made in view of the problems, and its object is to provide an image reading apparatus and an image reading method in each of which regardless of document paper types, document image data whose color tone is closer to a document color tone sensed by human eyes can be obtained.

Solution to Problem

In order to attain the object, an image reading apparatus of the present invention includes: (i) a light source section which directs light to a document, the light having a visible wavelength and an infrared wavelength; (ii) a light receiving section which receives the light reflected from the document and converts the reflected light to an electric signal, so as to prepare document image data that is image data of the document; (iii) a visible light cut filter which blocks light having the visible wavelength; (iv) a filter moving section which moves the visible light cut filter by changing states in which (a) the visible light cut filter is provided in an optical path in which the light is directed from the light source section to the document, reflected from the document, and then received by the light receiving section and (b) no visible light cut filter is provided in the optical path; (v) a color correction section which corrects a color of an image in the document image data; and (vi) a control section which controls operations of the respective sections (i) through (v) so that an infrared light scanning process, a visible light scanning process, and a color correction process are carried out, the infrared light scanning process being a process in which the light is directed from the light source section to at least a part of the document in a state in which the visible light cut filter is provided in the optical path, so that the light receiving section receives the reflected light from the document and prepares first image data which is document image data that corresponds to a result of receiving, by the light receiving section, light having the infrared wavelength, the visible light scanning process being a process in which the light is directed from the light source section to the document in a state in which no visible light cut filter is provided in the optical path, so that the light receiving section receives the reflected light from the document and prepares second image data which is document image data that corresponds to a result of receiving, by the light receiving section, light having the visible wavelength and light having the infrared wavelength, and the color correction process being a process in which the color correction section corrects a color of an image in the second image data in accordance with the first image data so as to remove or reduce, from the second image data, an influence of the light having the infrared wavelength.

An image data output processing apparatus of the present invention includes an image reading apparatus mentioned above, the image data output processing apparatus carrying out an output process with respect to the document image data which has been corrected by the image reading apparatus. Note that examples of the output process include: (i) a printing process in which an image in accordance with the image data is printed on a recording material, (ii) a display process in which an image in accordance with the image data is displayed in a display device, (iii) a transmission process in which the image data is transmitted to another device, and (iv) a filing process in which the image data is stored in a given destination.

An image reading method of the present invention carried out in an image reading apparatus including a light source section which directs light to a document, the light having a visible wavelength and an infrared wavelength, and a light receiving section which receives the light reflected from the document and converts the reflected light to an electric signal, so as to prepare document image data that is image data of the document, the image reading method includes the steps of: (i) carrying out an infrared light scanning process in which the light is directed from the light source section to at least a part of the document in a state in which a visible light cut filter that blocks light having the visible wavelength is provided in an optical path, in which the light is directed from the light source section to the document, reflected from the document, and then received by the light receiving section, so that the light receiving section receives the reflected light from the document and prepares first image data which is document image data that corresponds to a result of receiving, by the light receiving section, light having the infrared wavelength; (ii) carrying out a visible light scanning process in which the light is directed from the light source section to the document in a state in which no visible light cut filter is provided in the optical path, so that the light receiving section receives the reflected light from the document and prepares second image data which is document image data that corresponds to a result of receiving, by the light receiving section, light having the visible wavelength and light having the infrared wavelength; and (iii) carrying out a color correction process in which a color of an image in the second image data is corrected in accordance with the first image data so that an influence of the light having the infrared wavelength is removed or reduced from the second image data.

Advantageous Effects of Invention

According to the image reading apparatus, the image data output processing apparatus, and the image reading method, it is possible to remove, from visible light image data obtained by the visible light scanning process, an influence of light which has an infrared wavelength and is invisible (or less visible) to human eyes. Therefore, regardless of document paper types, document image data whose color tone is closer to a document color tone sensed by human eyes can be obtained.

BRIEF DESCRIPTION OF DRAWINGS

FIG. 1 is a flow chart illustrating a procedure carried out during image reading in an image forming apparatus in accordance with an embodiment of the present invention.

FIG. 2 is a cross-sectional schematic view illustrating an overall arrangement of the image forming apparatus in accordance with the embodiment of the present invention.

FIG. 3 is a functional block diagram of the image forming apparatus illustrated in FIG. 2.

FIG. 4(a) is a schematic view illustrating an overall arrangement of an image input apparatus provided in the image forming apparatus illustrated in FIG. 2.

FIG. 4(b) is a schematic view illustrating an overall arrangement of the image input apparatus provided in the image forming apparatus illustrated in FIG. 2.

FIG. 4(c) is a schematic view illustrating an overall arrangement of the image input apparatus provided in the image forming apparatus illustrated in FIG. 2.

FIG. 5 is a graph illustrating an example of RGB signal values obtained in a case where two documents (i) on which images that look substantially identical to human eyes are formed and (ii) whose paper types are different are read by a conventional image reading apparatus.

FIG. 6(a) is a graph illustrating an example of spectral sensitivity characteristics of light receiving elements which are provided in the conventional image reading apparatus and correspond to respective colors of RGB.

FIG. 6(b) is a graph illustrating an amount of light which (i) is reflected from each of two documents (a) on which images that look substantially identical to human eyes are formed and (b) whose paper types are different and (ii) enters a light receiving element via a visible light cut filter.

DESCRIPTION OF EMBODIMENTS 1-1. Overall Arrangement of Image Forming Apparatus 10

Figure 2:
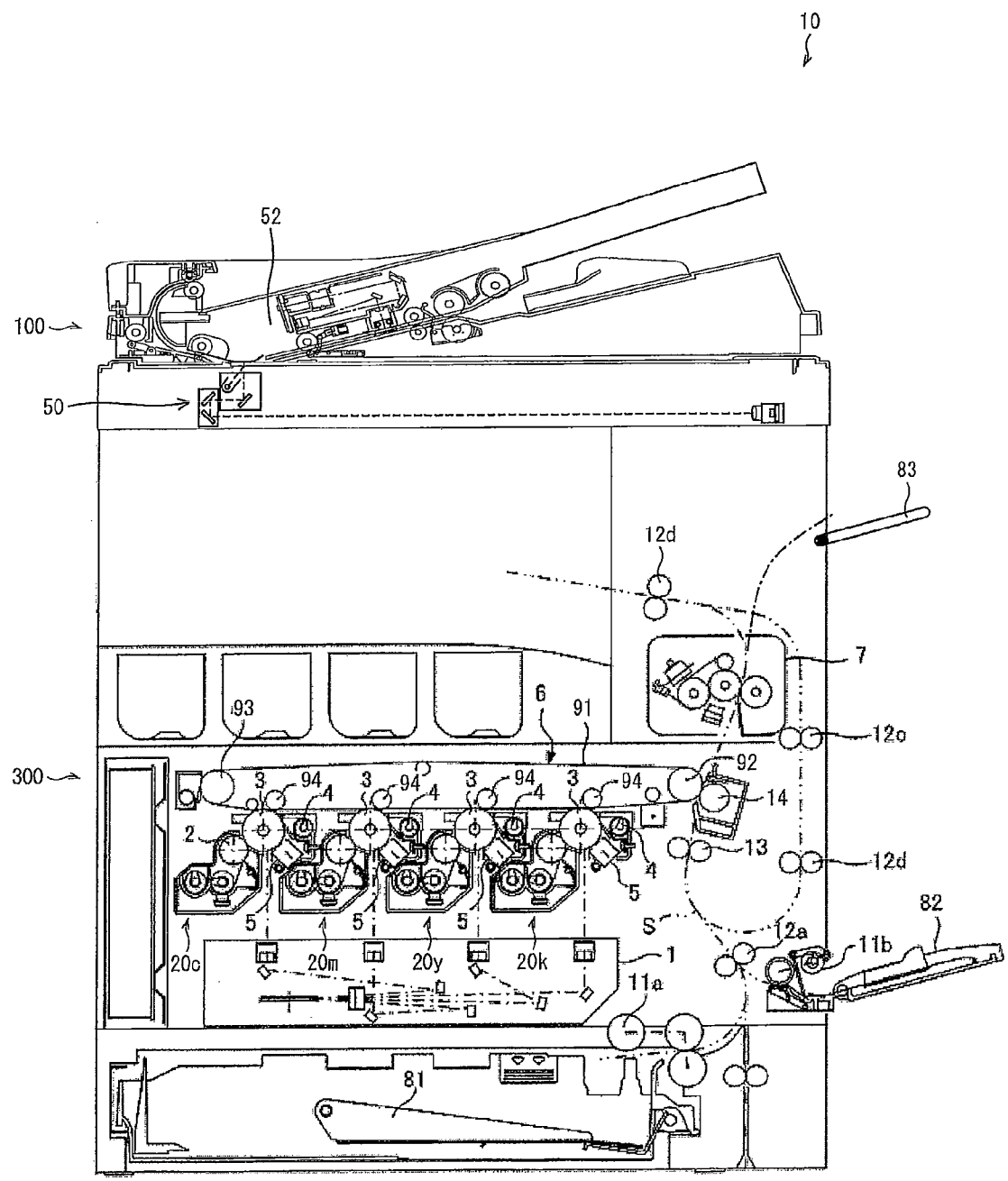
FIG. 2
Figure 3:
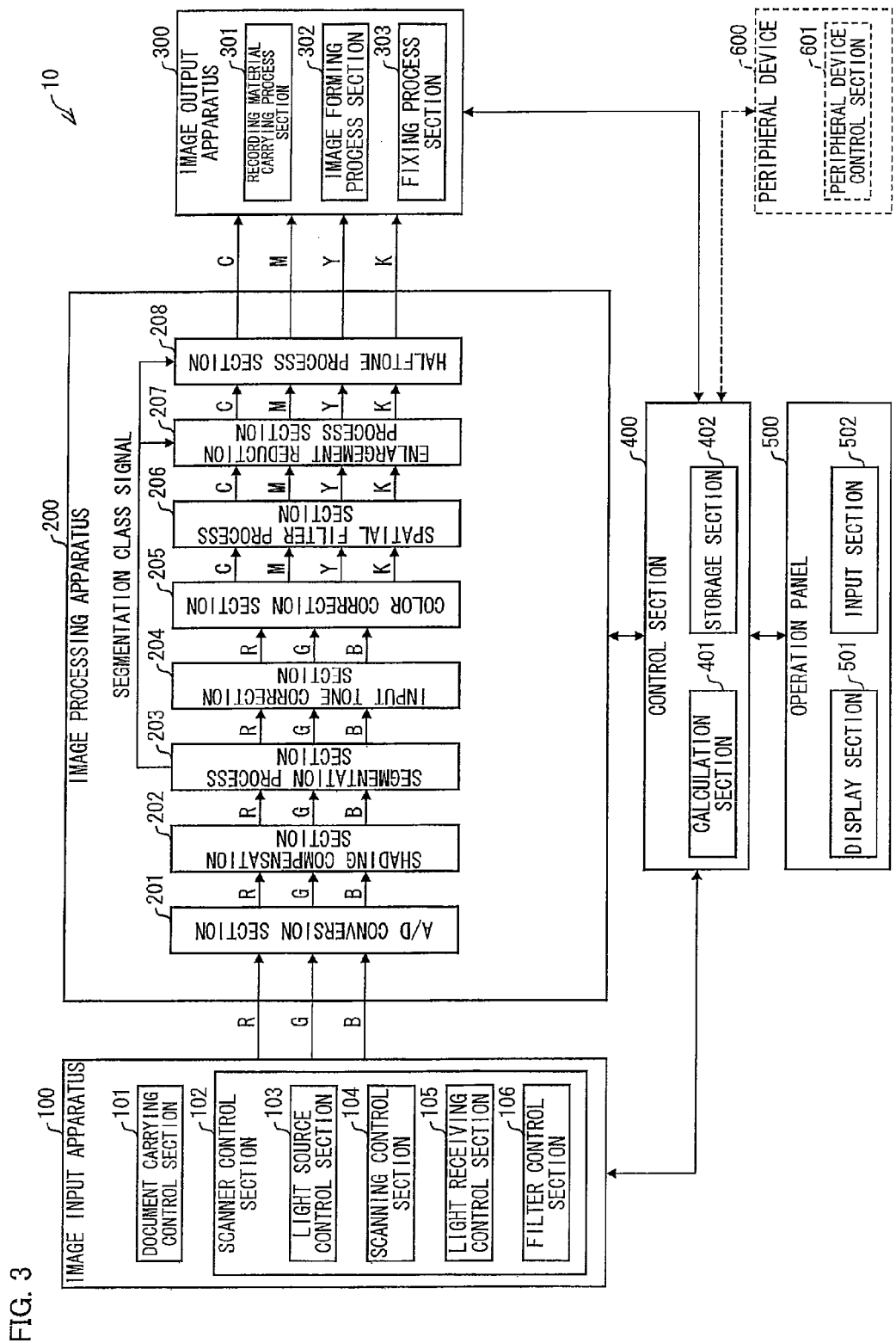
FIG. 3

FIG. 2 is a schematic view illustrating an overall arrangement of an image forming apparatus (an image reading apparatus, an image data output processing apparatus) 10 in accordance with the present embodiment. FIG. 3 is a block diagram of the image forming apparatus 10.

The image forming apparatus 10 includes an image input apparatus 100, an image processing apparatus 200, an image output apparatus (an image output section) 300, a control section 400, and an operation panel 500 (see FIGS. 2 and 3). Note that the image forming apparatus 10 can be provided with a peripheral device 600 according to need (see FIG. 3). Examples of the peripheral device 600 includes: a paper feeding device in which a recording material to be supplied to the image output apparatus 300 is contained and a post-processing device which carries out a post-process such as a stapling process, a sorting process, a punching process, and/or a bookbinding process with respect to the recording material on which an image has been formed by the image output apparatus 300.

The control section 400 includes a calculation section 401 and a storage section 402. The control section 400 controls each section of the image input apparatus 100, the image processing apparatus 200, the image output apparatus 300, and the operation panel 500, which are provided in the image forming apparatus 10. In a case where the image forming apparatus 10 is provided with the peripheral device 600, the control section 400 supplies a control signal to a peripheral device control section 601 provided in the peripheral device 600, so that the peripheral device control section 601 controls an operation of the peripheral device 600.

The storage section 402 mainly stores (i) commands and set values each of which is received from a user via the operation panel 500, (ii) a result of detection by sensors provided in the image forming apparatus 10, (iii) set values and data tables for controlling operations of the respective apparatuses or devices provided in the image forming apparatus 10, and (iv) a program for carrying out various controls. Examples of the storage section 402 includes various storage means which are commonly used in this field such as a read-only memory (ROM), a random access memory (RAM), and a hard disk drive (HDD).

The calculation section 401 retrieves (i) various sets of information and (ii) the program for carrying out various controls from the storage section 402, so as to carry out a calculation process and a determination process. In accordance with a result of these processes, the calculation section 401 supplies control signals to the respective apparatuses or devices provided in the image forming apparatus 10, so that the operations of the respective apparatuses or devices are controlled. Note that the calculation section 401 is exemplified by a processing circuit made by a microcomputer, a microprocessor, or the like which includes a central processing unit (CPU).

The image input apparatus 100 is provided on a top surface of a housing in which the image output apparatus 300 is contained (see FIG. 2). The image input apparatus 100 reads a document, so as to obtain image data of the document (document image data). The image data of the document read by the image input apparatus 100 is transmitted to the image processing apparatus 200, so as to be subjected to given image processing.

The image input apparatus 100 carries out an infrared light scanning process and a visible light scanning process. The infrared light scanning process is a process in which each of R, G, and B light receiving elements (a red light receiving element, a green light receiving element, and a blue light receiving element) receives reflected light from a document in a state in which a visible light cut filter is provided in an optical path in which the reflected light is directed from a light source to the document, is reflected from the document, and then reaches the R, G, and B light receiving elements. The visible light scanning process is a process in which each of the RGB light receiving elements receives the reflected light from the document in a state in which no visible light cut filter is provided in the optical path. Image data obtained by respective of the infrared light scanning process and the visible light scanning process are supplied to the image processing apparatus 200. The image input apparatus 100 is to be specifically described later.

With respect to the image data which the image input apparatus 100 has obtained by reading the document, the image processing apparatus 200 carries out image processing for (i) removing an influence of light in the near-infrared wavelength region and (ii) causing the image data to be suitable to be subjected to a printing process carried out in the image output apparatus 300. The image processing apparatus 200 includes an A/D conversion section 201, a shading compensation section 202, a segmentation process section 203, an input tone correction section (an image data correction section) 204, a color correction section (an image data correction section) 205, and a spatial filter process section 206, an enlargement reduction process section 207, and a halftone process section 208.

The A/D conversion section 201 converts analogue RGB signals, which have been received from the image input apparatus 100, to digital RGB signals, so as to supply the resulting digital RGB signals to the shading compensation section 202.

With respect to the document image data received from the A/D conversion section 201, the shading compensation section 202 carries out a distortion removal process in which document distortions produced in an illumination system, an image focusing system, and an image sensing system of the image input apparatus 100 are removed, so as to supply, to the segmentation process section 203, the document image data which has been subjected to the distortion removal process.

The segmentation process section 203 segments pixels in the document image data received from the shading compensation section 202 into any one of a black text region, a color text region, a halftone dot region, and a photograph region (a continuous tone region). Note that a method for carrying out a segmentation process is not particularly limited. The segmentation process can be carried out by a conventionally publicly-known method. In accordance with a result of the segmentation, the segmentation process section 203 (i) supplies, to each of the spatial filter process section 206 and the halftone process section 208, a segmentation class signal indicating to which region a pixel belongs and (ii) supplies, to the input tone correction section 204, the document image data received from the shading compensation section 202 as it is. In accordance with the segmentation class signal received from the segmentation process section 203, the spatial filter process section 206 and the halftone process section 208 carry out respective processes which are suitable for each region.

The input tone correction section 204 (i) adjusts a color balance of the image data received from the segmentation process section 203 and (ii) converts the image data to a signal such as a density (pixel value) signal which can be easily processed in an image processing system employed in the image processing apparatus 200. The input tone correction section 204 carries out an image quality adjustment process such as a removal of a page-background color density and/or a contrast adjustment. The input tone correction section 204 supplies, to the color correction section 205, the document image data which has been subjected to the processes carried out by the input tone correction section 204.

The A/D conversion section 201, the shading compensation section 202, the segmentation process section 203, and the input tone correction section 204 carry out the respective processes mentioned above with respect to each of (i) the image data (image data S1, first image data) obtained by the infrared light scanning process carried out by the image input apparatus 100 and (ii) the image data (image data S2, second image data) obtained by the visible light scanning process carried out by the image input apparatus 100.

The color correction section 205 carries out (i) a process (a color correction process) in which an influence of the image data S1 is reduced from the image data S2 and (ii) a process (a color correction process) in which the image data S2 from which the influence of the image data S1 has been reduced is converted to document image data of CMYK (C: cyan, M: magenta, Y: yellow, K: black) signals and the resulting document image data has a higher color reproducibility. The color correction section 205 supplies, to the spatial filter process section 206, the document image data which has been subjected to the color correction.

Note that in order to reduce the influence of the image data S1 from the image data S2, the color correction section 205 calculates averages of respective RGB values (values corresponding to respective amounts of near-infrared light received) of each pixel in the image data S1, so as to subtract the averages from respective RGB values of each pixel in the image data S2.

In accordance with the segmentation class signal, the spatial filter process section 206 carries out a spatial filter process (an enhancement process and/or a smoothing process) by use of a digital filter with respect to the document image data of the CMYK signals which is received from the color correction section 205, so as to correct spatial frequency characteristics. This can reduce a blur or a granularity deterioration in an output image. The spatial filter process section 206 supplies, to the enlargement reduction process section 207, the document image data of the CMYK signals which has been subjected to the spatial filter process.

The enlargement reduction process section 207 enlarges or reduces an image size of the document image data of the CMYK signals which has been received from the spatial filter process section 206 to a size in accordance with an instruction from the control section 400, so as to supply, to the halftone process section 208, the document image data whose size has been enlarged or reduced.

With respect to the document image data received from the enlargement reduction process section 207, the halftone process section 208 carries out (i) an output gamma correction process for causing the image output apparatus 300 to supply an image in accordance with the document image data to a recording material such as paper and (ii) a tone reproduction process (a halftone generation process) in which the document image data are segmented into pixels so that tones of the respective pixels can be reproduced.

The image data which has been subjected to the above-mentioned processes carried out in the image processing apparatus 200 is temporarily stored in a memory (not illustrated) and then read out from the memory at a given timing to be supplied to the image output apparatus 300.

According to the above description, the document image data is sequentially transferred to the A/D conversion section 201, the shading compensation section 202, the segmentation process section 203, the input tone correction section 204, the color correction section 205, and the spatial filter process section 206, the enlargement reduction process section 207, and the halftone process section 208 in this order. However, it is not required that the document image data be transferred from a first process section to a second process section following the first process section as described above. According to need, the document image data processed by the first process section can be temporarily stored in a memory (not illustrated) and then read out from the memory at a given timing, so as to be supplied to the second process section. Similarly, the segmentation class signal and a signal indicating a regular reflectance can be temporarily stored in the memory and then read out from the memory at a given timing, so as to be supplied to a given process section. The memory is exemplified by a random access memory (RAM) and a hard disk drive (HDD).

The image output apparatus 300 forms (prints), on a recording material, an image in accordance with the image data received from the image processing apparatus 200.

Note that an arrangement of the image output apparatus 300 is not particularly limited. An electrophotographic image output apparatus is used in the present embodiment. Specifically, the image output apparatus 300 includes a paper feeding tray 81, a manual paper feeding tray 82, pickup rollers 11a and 11b, carrying rollers 12a, 12b, 12c, and 12d, image forming units 20c, 20m, 20y, and 20k, an intermediate transfer device 6, a second transfer roller 14, and a fixing device 7 (see FIG. 2).

A recording material carrying process section 301 controls operations of respective of the pickup rollers 11a and 11b and the carrying rollers 12a, 12b, 12c, and 12d, etc. The recording material carrying process section 301 carries, to a part in which the second transfer roller 14 and the intermediate transfer device 6 face each other, (i) a recording material placed on the paper feeding tray 81 or on the manual paper feeding tray 82 or (ii) a recording material whose front and back sides are reversed after the recording material is subjected to a fixing process carried out by the fixing device 7. The recording material carrying process section 301 carries, to the fixing device 7, the recording material to which a toner image has been transferred in the part, so that the recording material which has been subjected to the fixing process is discharged to a paper output tray 83.

An image forming process section 302 controls operations of respective of the image forming units 20*c*, 20*m*, 20*y*, and 20*k*, the intermediate transfer device 6, and the second transfer roller 14, so as to form a toner image in accordance with image data and to transfer the toner image thus formed to a recording material.

The image forming units 20*c*, 20*m*, 20*y*, and 20*k* prepare respective toner images of cyan, magenta, yellow, and black in accordance with image data. The image forming units 20*c*, 20*m*, 20*y*, and 20*k* are substantially similarly arranged, except that toners of different colors are used. Namely, each of the image forming units 20*c*, 20*m*, 20*y*, and 20*k* includes (i) a photoreceptor drum 3, (ii) a charger 5 which uniformly charges a top surface of the photoreceptor drum 3, (iii) a light scanning unit 1 in which light in accordance with image data of a corresponding color of the each of the image forming units is directed to the top surface of the photoreceptor drum 3 which top surface has been charged, so that an electrostatic latent image is formed on the top surface of the photoreceptor drum 3, (iv) a developing device 2 in which the electrostatic latent image formed on the top surface of the photoreceptor drum 3 is developed by use of a toner of the corresponding color of the each of the image forming units, and (v) a cleaning device 4 which removes a toner that remains on the top surface of the photoreceptor drum 3 without being transferred from the photoreceptor drum 3 to an intermediate transfer belt 91 (described later).

The intermediate transfer device 6 includes supporting rollers 92 and 93, the intermediate transfer belt 91 which is suspended between the supporting rollers 92 and 93 so as to be driven to rotate, and transfer rollers 94 which are provided so as to face respective photoreceptor drums 3. Voltages of a reverse polarity to a charge polarity of toner images formed on top surfaces of the respective photoreceptor drums 3 are applied to the respective transfer rollers 94. Such a voltage application causes the toner images of the respective colors, which toner images are formed on the top surfaces of the respective photoreceptor drums 3, to be superimposed on and transferred to the intermediate transfer belt 91. Then, the intermediate transfer belt 91 rotates, so as to carry the toner images transferred thereto to a part in which the intermediate transfer belt 91 and the second transfer roller 14 face each other.

A recording material to which the toner images are to be transferred is carried between the second transfer roller 14 and the intermediate transfer belt 91 in sync with the toner images on the intermediate transfer belt 91 which are carried to the part in which the intermediate transfer belt 91 and the second transfer roller 14 face each other. Namely, (1) a recording material extracted from the paper feeding tray 81 by the pickup roller 11*a* and then carried via the carrying roller 12*a*, a registration roller 13, etc., (2) a recording material extracted from the manual paper feeding tray 82 by the pickup roller 11*b* and then carried via the carrying roller 12*a*, the registration roller 13, etc., or (3) a recording material whose front and back sides are reversed by switchback by the carrying roller 12*d* after the recording material is subjected to the fixing process (described later) carried out by the fixing device 7 and which is carried again via the carrying rollers 12*c* and 12*d*, the registration roller 13, etc is carried between the second transfer roller 14 and the intermediate transfer belt 91. A high voltage of a reverse polarity to a charge polarity of the toners is applied to the second transfer roller 14. This causes the toner images on the intermediate transfer belt 91 to be subjected to a second transfer to the recording material.

A fixing process section 303 controls an operation of the fixing device 7 so as to fix, onto the recording material, the toner images which have been transferred to the recording material. Namely, the recording material to which the toner images have been transferred in the part in which the intermediate transfer belt 91 and the second transfer roller 14 face each other is carried to the fixing device 7, which carries out the fixing process for fixing the toner images to the recording material.

Note that an arrangement of the image output apparatus 300 is not limited to that of an electrophotographic image output apparatus. For example, an ink-jet image forming apparatus can be used as the image output apparatus 300.

The operation panel 500 includes (i) an input section 502 which receives an input of an instruction from the user and transmits the instruction to the control section 400 and (ii) a display section 501 for displaying various sets of information to be presented to the user. The display section 501 mainly includes a liquid crystal display, for example. The input section 502 mainly includes various setting buttons, for example. Note that the operation panel 500 can be provided with a touch panel into which functions of respective of the display section 501 and the input section 502 are integrated.

1-2. Arrangement of Image Input Apparatus 100

Figure 4:
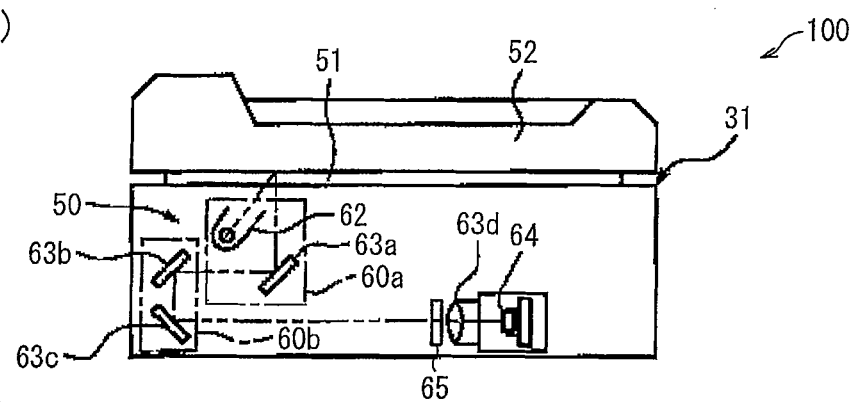
FIG. 4(a)
FIG. 4(b)
FIG. 4(c)
Figure 4:
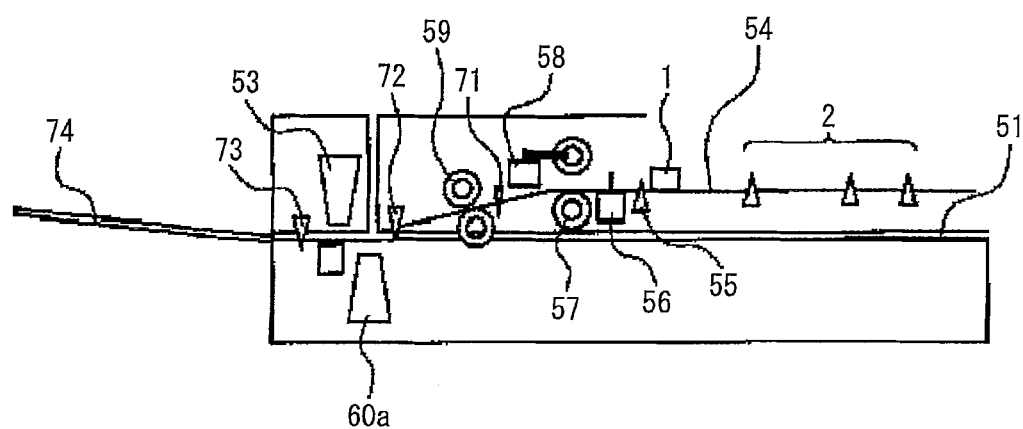
Figure 4:
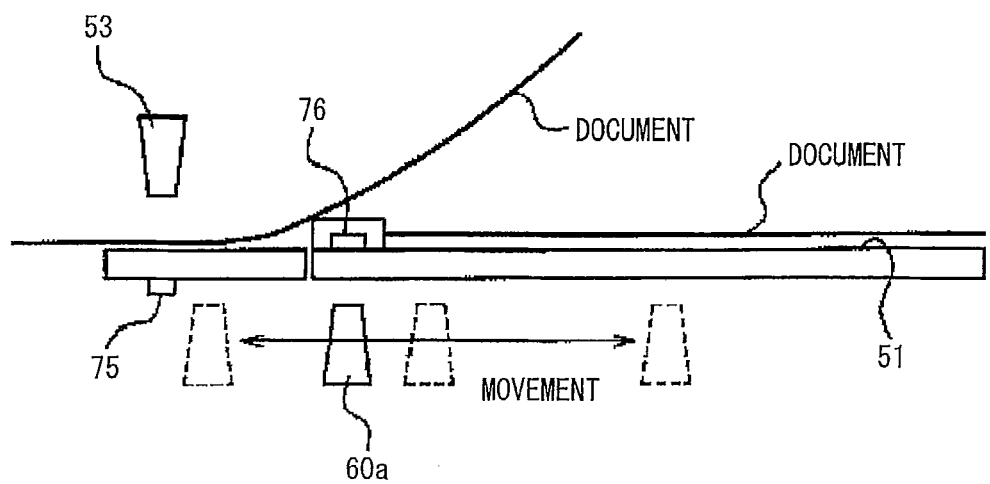
Figure 5:
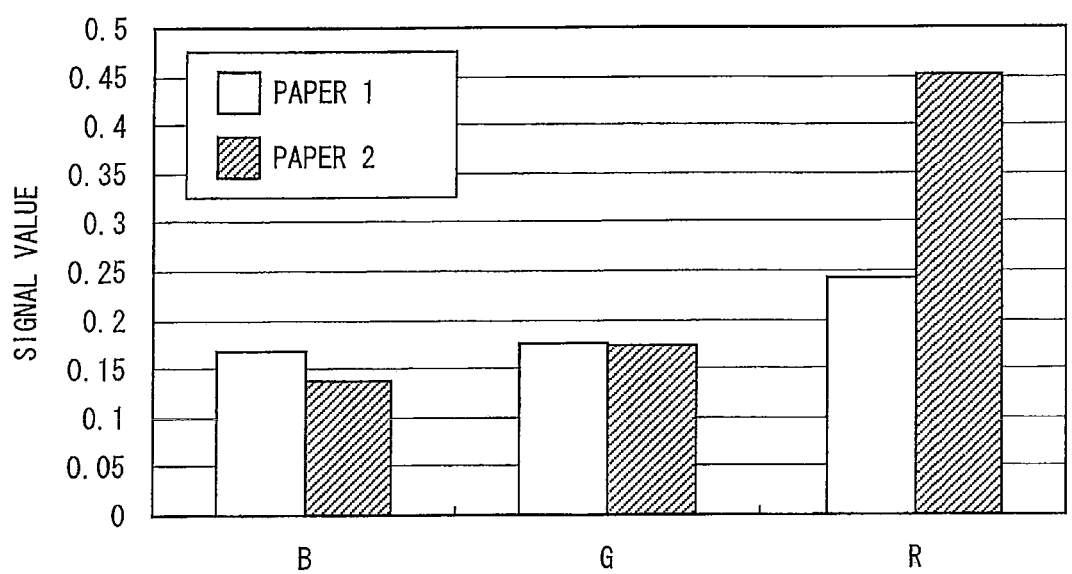
FIG. 5
Figure 6:
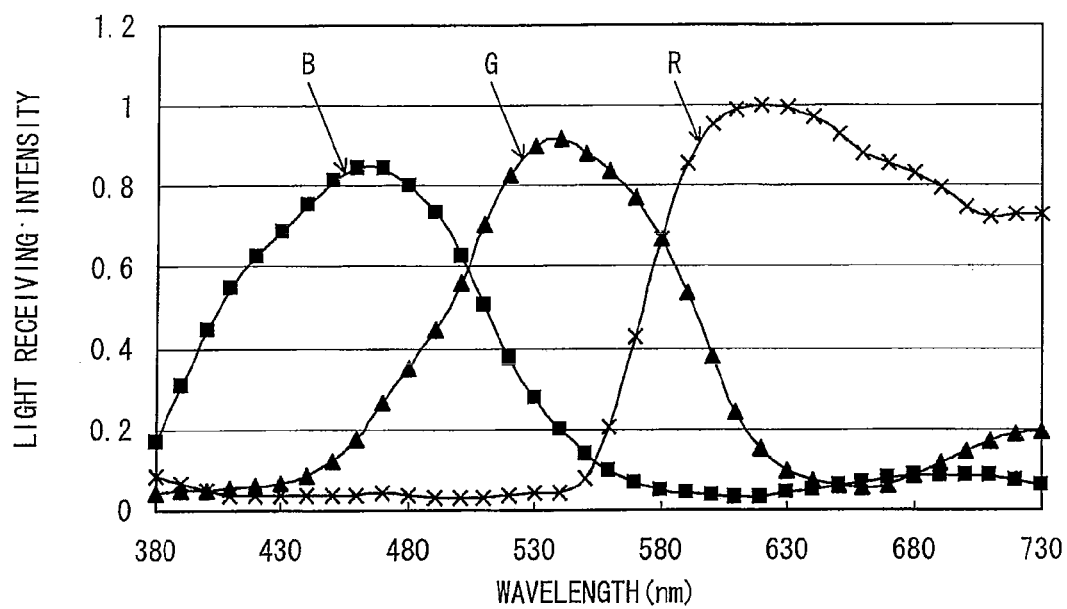
FIG. 6(a)
FIG. 6(b)
Figure 6:
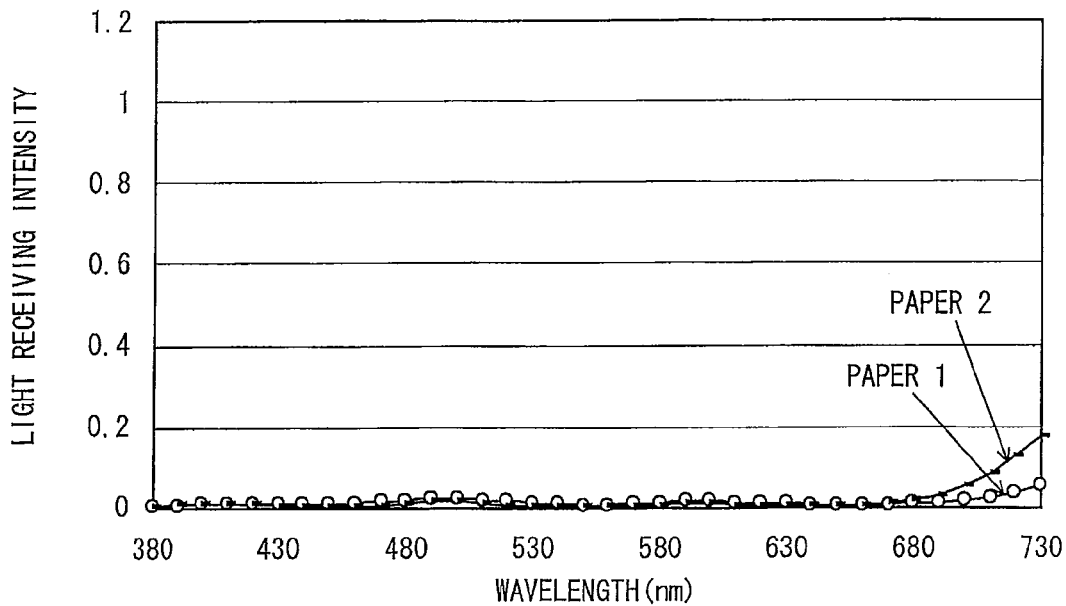

The following description discusses the arrangement of the image input apparatus 100 with reference to FIGS. 3 and 4(*a*) through 4(*c*).

FIG. 4(*a*) is a cross-sectional view of the image input apparatus 100. The image input apparatus 100 includes (i) a platen 51 which is made of transparent glass and serves as a scanner platen, (ii) a DSPF (Duplex Single Pass Feeder) which serves as a platen cover for automatically feeding a document onto the platen 51, and (iii) a scanner unit (a document image reading unit) 50 for reading, by scanning, an image of the document placed on the platen 51 (see FIG. 4(*a*)). The image input apparatus 100 includes a document carrying control section 101 for controlling an operation of the DSPF and a scanner control section 102 for controlling an operation of the scanner unit 50 (see FIG. 3). The scanner control section 102 includes a light source control section 103, a scanning control section 104, a light receiving control section 105, and a filter control section 106.

The DSPF 52 includes a document tray (not illustrated). The DSPF 52 automatically feeds, one by one, a plurality of documents set on the document tray onto the platen 51. In order to cause the scanner unit 50 to read one side or both sides of a document in accordance with a selection by the user, the DSPF 52 includes (i) a path through which a single-sided document is carried, (ii) a path through which a double-sided document is carried, (iii) means for switching the paths (i) and (ii), and (iv) a sensor group which grasps a state of a document passing through each section, so as to control the document. The control section 400 transmits a control command to the document carrying control section 101 in accordance with (i) various programs and control information each being stored in the storage section 402, (ii) an instruction from the user supplied to the control section 400 via the operation panel 500, and (iii) a result of detection by the sensor group. The document carrying control section 101 controls operations of respective sections of the DSPF 52 in accordance with the control command. No more description of the DSPF 52 is to be given since many patent applications have been filed for DSPFs and DSPFs have been commercialized.

The scanner unit (a light receiving section) 50 includes (i) a light source (a lamp reflector assembly, a light source section) 62 for exposing a document plane to light, (ii) a first scanning unit 60a provided with a first reflection mirror (an optical element) 63a and a fourth reflection mirror 63e each of which reflects reflected light from a document, so as to guide, to a CCD element (a light receiving element and a photoelectric conversion element) 64, an image of the reflected light from the document, (iii) a second scanning unit 60b provided with a second reflection mirror 63b and a third reflection mirror 63c each of which guides the image of the reflected light from the first reflection mirror 63a to the CCD element 64, (iv) a visible light cut filter 65 which is provided in an optical path in which the reflected light is reflected by the third reflection mirror 63c and then enters an optical lens 63d, (v) a filter moving section (not illustrated) which moves the visible light cut filter 65 by changing states in which (a) the visible light cut filter 65 is provided in the optical path and (b) no visible light cut filter 65 is provided in the optical path, (vi) the optical lens 63d for causing an image to be formed on the CCD element 64 which converts the image of the reflected light from the document to an electric image signal via each of the above-mentioned reflection mirrors, and (vii) the CCD element (light receiving element) 64 which converts the image of the reflected light from the document to the electric image signal. Note that the light source 62 directs, to a document, light having a visible wavelength and an infrared wavelength (including a near-infrared wavelength).

According to the present embodiment, a plurality of CCD elements which have respective peak light receiving sensitivities at different wavelengths are provided as the CCD element 64. In accordance with a result obtained by the plurality of CCD elements which have received the reflected light from the document, so as to convert the received reflected light to respective electric signals, document image data of a plurality of color components which correspond to the respective CCD elements is prepared. Specifically, according to the present embodiment, an R CCD element (a red light receiving element), a G CCD element (a green light receiving element), and a B CCD element (a blue light receiving element) are provided as the CCD element 64. The R CCD element has a peak light receiving sensitivity in a wavelength region corresponding to R (red) and receives light in the wavelength region corresponding to R, so as to convert the received light to an electric signal. The G CCD element has a peak light receiving sensitivity in a wavelength region corresponding to G (green) and receives light in the wavelength region corresponding to G, so as to convert the received light to an electric signal. The B CCD element has a peak light receiving sensitivity in a wavelength region corresponding to B (blue) and receives light in the wavelength region corresponding to B, so as to convert the received light to an electric signal. Document Image data of RGB components is thus prepared in accordance with these resulting electric signals.

The filter moving section includes a motor, a gear, a cam, etc. The control section 400 controls operations of these respective members, so as to change the states in which (i) the visible light cut filter 65 is provided in the optical path of the reflected light from the document and (ii) no visible light cut filter 65 is provided in the optical path. Note that an arrangement of the filter moving section is not particularly limited. It is only required to arrange the filter moving section such that states can be changed in which (i) the visible light cut filter 65 is provided in an optical path in which light from the light source 62 is reflected from a document and is received by the CCD element 64 and (ii) no visible light cut filter 65 is provided in the optical path. According to the present embodiment, the visible light cut filter 65 is provided between the third reflection mirror 63c and the optical lens 63d. However, an arrangement of the visible light cut filter 65 is not limited to this. It is only required that the visible light cut filter 65 be provided in an optical path in which the light from the light source 62 enters the CCD element 64 via a document.

The visible light cut filter 65 is not particularly limited, provided that the visible light cut filter 65 can block visible light and cause infrared light (near-infrared light) to pass therethrough. For example, a light absorption and infrared transmission filter (IR filter) (product name, produced by FUJIFILM Corporation) can be used as the visible light cut filter 65.

In the present embodiment, a filter which blocks light having a wavelength of not more than 700 nm and through which light having a wavelength of more than 700 nm passes was used as the visible light cut filter 65. However, a wavelength region in which light is blocked by the visible light cut filter 65 is not limited to this. There are variations among individuals in upper limit (visible upper limit) of a wavelength which is visible to human eyes. For example, JIS Z8120 prescribes that an upper limit of visible light is 760 nm to 800 nm. In contrast, in CIEXYZ, a sensitivity of the eye to light having a wavelength of not less than 700 nm is approximated to substantially zero based on a conversion formula by which a spectral distribution of light is converted to CIEXYZ (an XYZ color system which is a standard color system of CIE (International Commission on Illumination). Therefore, in view of, for example, a visual characteristic of the user who is expected to use the image forming apparatus 10, a lower limit (a transmission lower limit) of a wavelength region in which light passes through the visible light cut filter 65 is required to be set to a given value which falls within a range of, for example, 700 nm to 800 nm.

The light source control section 103 provided in the scanner control section 102 controls turning on/off of the light source 62. The scanning control section 104 controls movement (traveling) along the platen 51 of the first scanning unit 60a and the second scanning unit 60b. The light receiving control section 105 controls an operation of the CCD element 64. The filter control section 106 controls an operation of the filter moving section.

The DSPF 52 of the image input apparatus 100 is openable and closable to the platen 51 by a hinge member (not illustrated) provided at one end of the DSPF 52. In a case where a document placed on the platen 51 is read, the user opens the DSPF 52, places a document to be read on the platen 51, and closes the DSPF 52, so that the document is read by the scanner unit 50. Note that the image input apparatus 100 includes an opening/closing detection sensor (not illustrated) which detects opening/closing of the DSPF 52.

The image input apparatus 100 reads the document placed on the platen 51 by causing the scanner unit 50 to move along a bottom surface of the platen 51 and to read a document image. Specifically, in accordance with an instruction from the control section 400, the scanning control section 104 causes (i) the first scanning unit 60a to travel at a given speed V in a horizontal direction along the platen 51 and (ii) the second scanning unit 60b to travel at a speed V/2, which is half the speed V, in a direction identical to the direction in which the first scanning unit 60a travels. This allows an image of the document placed on the platen 51 to be sequentially formed on the CCD element 64 for each line, so that the image can be read.

FIG. 4(b) is a cross-sectional view of the image input apparatus 100. The image input apparatus 100 includes optical systems provided above and below the platen 51 (see FIG. 4(b)). Namely, the image input apparatus 100 includes the scanner unit (a first reading optical section) 50 provided below the platen 51 and a second reading optical section 53 provided above the platen 51. The second reading optical section 53 is fixed to the DSPF 52, and its relative position is fixed with respect to the platen 51. Note that for convenience, FIG. 4(b) illustrates only the first scanning unit 60a of the scanner unit 50.

The image input apparatus 100 carries out automatic double-sided document scanning by causing the scanner unit 50 to move to a position (a first document reading position) (illustrated in FIG. 4(b)) and causing each of the scanner unit 50 and the second reading optical section 53 to simultaneously read both sides of a document carried by the DSPF 52.

More specifically, in the case where automatic double-sided document reading is carried out, a document presence detection sensor 55 first detects a document placed on a document placing tray 54 of the DSPF 52. In accordance with a result of the detection, the document carrying control section 101 of the image input apparatus 100 opens a document stopper 56 and drives a paper feeding roller 57, a paper pickup claw 58, and a registration roller 59 to carry the document to the first document reading position. This causes (i) the document to pass between the first scanning unit 60a and the second reading optical section 53 and (ii) the scanner control section 102 to control operations of respective of the scanner unit 50 and the second reading optical section 53 in accordance with a timing at which the document is carried by the DSPF 52, so that front and back sides of the document are read. Then, the document thus read is discharged to a paper output tray 74. Automatic single-sided document reading is carried out as in the case of automatic double-sided document reading, except that the second reading optical section 53 does not read the back side of the document.

Along a direction in which a document is carried, the DSPF 52 includes (i) a sensor 71 before a registration roller which sensor is provided short of the registration roller 59, (ii) a document edge detection sensor 72 provided short of the second reading optical section 53, and (iii) a paper output sensor 73 provided ahead of the scanner unit 50.

The DSPF 52 includes white boards 75 and 76 each of which serves as a reference for shading compensation (see FIG. 4(c)). FIG. 4(c) illustrates how the image input apparatus 100 operates during shading compensation.

The white board 75 is provided on a glass bottom surface of the platen 51 in the first document reading position, and the white board 76 is provided on a glass top surface of the platen 51 in the second document reading position. Note that in order to carry out shading compensation, the scanner unit 50 moves to the second document reading position so as to read the white board 76. A result of reading of the white board 76 by the scanner unit 50 and a result of reading of the white board 75 by the second reading optical section 53 are transmitted to the image processing apparatus 200, so as to be used for a shading compensation process (described later) carried out by the shading compensation section 202.

1-3. Processes Carried Out During Image Reading

Figure 1:
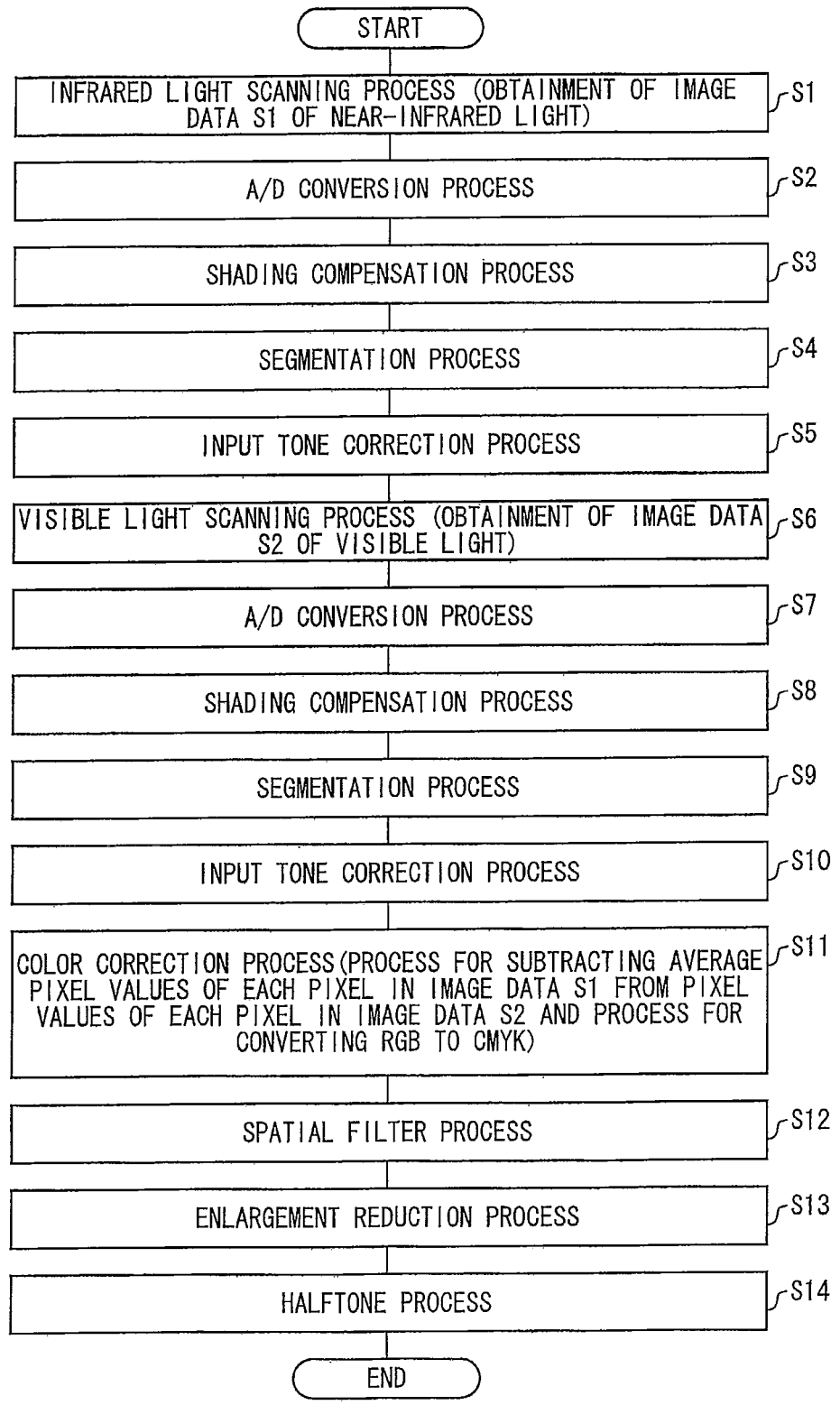
FIG. 1

An image reading method carried out in the image input apparatus 100 and the image processing apparatus 200 is described below with reference to a flowchart illustrated in FIG. 1. FIG. 1 is the flowchart illustrating how an image reading process is carried out in the image input apparatus 100 and the image processing apparatus 200. Note that a process in which a document placed on the platen 51 is read is to be described here.

First, the control section 400 controls the scanner control section 102 to carry out the infrared light scanning process (a infrared light scanning step) in which reflected light from the document is received via the visible light cut filter 65 and to obtain image data (first image data) S1 of near-infrared light (S1). Specifically, the filter control section 106 controls drive means of the filter moving section in accordance with an instruction from the control section 400 to provide the visible light cut filter 65 in an optical path of the reflected light from the document. The scanning control section 104 controls each of the first scanning unit 60a and the second scanning unit 60b to travel in parallel to the platen 51. The light source control section 103 controls the light source 62 to direct light to the document. The light receiving control section 105 controls the CCD element 64 to sequentially receive, for each line, the reflected light from the document placed on the platen 51 and to convert the reflected light to electric signals (analogue RGB signals (the image data S1)), so that the resulting electric signals are supplied to the image processing apparatus 200. Note that the whole or only a part of the document can be read in the infrared light scanning process.

Next, the control section 400 causes (i) the A/D conversion section 201 to convert the image data S1 to digital RGB signals (S2), (ii) the shading compensation section 202 to carry out the shading compensation process (S3), (iii) the segmentation process section 203 to carry out the segmentation process (S4), and (iv) the input tone correction section 204 to carry out an input tone correction process (S5).

Subsequently, the control section 400 controls the scanner control section 102 to carry out the visible light scanning process (a visible light scanning step) in which the reflected light from the document is received via no visible light cut filter 65 and to obtain image data (second image data) S2 of visible light and near-infrared light (S6). Specifically, the filter control section 106 controls the drive means of the filter moving section in accordance with the instruction from the control section 400 to provide no visible light cut filter 65 in the optical path of the reflected light from the document. The scanning control section 104 controls each of the first scanning unit 60a and the second scanning unit 60b to travel in parallel to the platen 51. The light source control section 103 controls the light source 62 to direct light to the document. The light receiving control section 105 controls the CCD element 64 to sequentially receive, for each line, the reflected light from the document placed on the platen 51 and to convert the reflected light to electric signals (analogue RGB signals (the image data S2)), so that the resulting electric signals are supplied to the image processing apparatus 200. Note that image data of the whole of the document is obtained in the visible light scanning process.

Then, the control section 400 causes (i) the A/D conversion section 201 to convert the image data S2 to digital RGB signals (S7), (ii) the shading compensation section 202 to carry out the shading compensation process (S8), (iii) the segmentation process section 203 to carry out the segmentation process (S9), and (iv) the input tone correction section 204 to carry out the input tone correction process (S10).

Next, the control section 400 causes the color correction section 205 to carry out (i) a process (the color correction process, a color correction step) in which averages of respective RGB values of each pixel in the image data S1 are subtracted from respective RGB values of each pixel in the image data S2 and (ii) a process in which the image data with RGB color space which image data has been subjected to the process (i) is converted to image data with CMYK color space (S11).

Specifically, the color correction section 205 carries out a process in which averages of respective RGB values of each pixel in the image data S1 are calculated. Subsequently, the color correction section 205 subtracts the averages from respective RGB values of each pixel in the image data S2. Then, the color correction section 205 converts, to the image data with CMYK color space, the image data S2 with RGB color space which image data S2 has been subjected to the subtraction process. A method for carrying out such a conversion process is not particularly limited. The conversion process can be carried out by a conventionally publicly-known method. For example, the conversion process can be carried out by use of a preset color conversion table.

Thereafter, the control section 400 controls (i) the spatial filter process section 206 to carry out the spatial filter process in accordance with the segmentation class signal with respect to the image data with CMYK color space (S12), (ii) the enlargement reduction process section 207 to carry out an enlargement or a reduction process so that the image data has a size in accordance with the input of the instruction from the user (S13), and (iii) the halftone process section 208 to carry out a halftone process in accordance with the segmentation class signal (S14). Then, the control section 400 causes the image output apparatus 300 to output the image data with CMYK color space which image data has been subjected to the halftone process, so that the image reading process is completed.

As described earlier, the image input apparatus of the present embodiment carries out (i) the infrared light scanning process in which each of the RGB light receiving elements receives, via the visible light cut filter, the light which has been directed from the light source to the document and then reflected from the document and (ii) the visible light scanning process in which each of the RGB light receiving elements receives, via no visible light cut filter, the light which has been directed from the light source to the document and then reflected from the document. Then, the image processing apparatus of the present embodiment causes the color correction section to calculate averages of respective RGB values of each pixel in the image data S1 which has been obtained by the infrared light scanning process and corresponds to a result of receiving light having the infrared wavelength and to subtract the averages from respective RGB values of each pixel in the image data S2 which has been obtained by the visible light scanning process and corresponds to a result of receiving light having the visible wavelength and light having the infrared wavelength.

This makes it possible to remove, from the image data S2 obtained by the visible light scanning process, the influence of light which has a near-infrared wavelength and is invisible (or less visible) to human eyes. Accordingly, regardless of document paper types, document image data whose color tone is closer to a document color tone sensed by human eyes can be obtained.

In general, a reflection characteristic of near-infrared light due to a document depends on a paper type of the document and hardly depends on a color material (ink, toner, etc.) from which an image on the document is formed. Therefore, it is not always necessary to obtain image data of the whole of the document in the infrared light scanning process. The infrared light scanning process can be arranged such that image data of only a part of the document is obtained, so that averages of respective amounts of near-infrared light received (averages of respective RGB values) of each pixel are calculated based on the image data. In addition, in a case where image data of only a part of the document is obtained by the infrared light scanning process, there is little influence of a color material as described earlier. Therefore, it is only required that image data of any region (including a region in which an image is formed) of the document be obtained. In a case where only a part of the document is read in the infrared light scanning process, (i) (a) the infrared light scanning process and (b) the process in which averages of respective pixel values are calculated can be carried out in a shorter time and (ii) the averages can be calculated with a lighter calculation load.

In the present embodiment, the infrared light scanning process is first carried out and then the visible light scanning process is carried out. However, how to arrange the infrared light scanning process and the visible light scanning process is not limited to this. Namely, the infrared light scanning process and the visible light scanning process can be arranged such that the visible light scanning process is first carried out so as to obtain the image data S2 and then the infrared light scanning process is carried out so as to obtain the image data S1.

In the present embodiment, averages of respective pixel values of each pixel are across-the-board calculated for the whole of the document in accordance with the image data S1 obtained by the infrared light scanning process. However, how to calculate averages of respective pixel values of each pixel is not limited to this. For example, assuming that the whole of the document is read by the infrared light scanning process, averages of respective pixel values of each pixel can be calculated for each region obtained by the segmentation process, so that the averages calculated for the each region of the image data S1 can be subtracted from pixel values of respective pixels in each corresponding region of the image data S2. Note that a result of the segmentation process which result is referred to in this case can be a result of the segmentation process carried out with respect to either the image data S1 or the image data S2.

In a case where the visible light scanning process is carried in advance of the infrared light scanning process, a region of the document which region is to be read by the infrared light scanning process can be set in accordance with the result of the segmentation process carried out with respect to the image data S2.

For example, the control section 400 can set a part or the whole of each region obtained by the segmentation process carried out with respect to the image data S2 obtained by the visible light scanning process to be read in the infrared light scanning process. In this case, averages of respective pixel values of each pixel can be calculated for the each region in accordance with the image data S1 obtained by the infrared light scanning process, so that the averages calculated for the each region of the image data S1 can be subtracted from pixel values of respective pixels in each corresponding region of the image data S2. According to this, even in a case where a document to a part of which paper of different type is attached (e.g., a text document to a part of which paper of different type such as a photograph is attached) is read, it is possible to remove an influence of near-infrared light for each region of the document. This makes it possible to obtain document image data whose color tone is closer to a document color tone sensed by human eyes.

The control section 400 can determine, in accordance with the result of the segmentation process carried out with respect to the image data S2 obtained by the visible light scanning process, whether or not a specific type region (e.g., a photograph region) which is a given type region exists in the document, so that at least a part of the specific type region and at least a part of the other region of the document can be set to be read in the infrared light scanning process. In this case, the control section 400 is required to calculate averages of respective pixel values of each pixel for each of the specific type region and the other region of the document, so that the averages calculated for the each of the regions of the image data S1 can be subtracted from pixel values of respective pixels in each corresponding region of the image data S2. According to this, even in a case where a document to a part of which paper of given type is attached (e.g., a text document to a part of which paper of different type such as a photograph is attached) is read, it is possible to remove an influence of near-infrared light for each region of the document.

The present embodiment discussed the arrangement in which RGB components of the image data S2 are corrected in accordance with the image data S1. However, how to carry out color correction is not limited to this. For example, at least the R component out of the RGB components of the image data S2 can be corrected in accordance with an average of an R value of each pixel in the image data S1.

According to an arrangement in which RGB light receiving elements are provided, the R light receiving element generally has a higher sensitivity to light in the infrared wavelength region than the G and B light receiving elements. Therefore, in a case where at least the R component of the image data S2 is corrected in accordance with the image data S1, it is possible to remove or reduce, from the image data S2, an influence of light which has an infrared wavelength and is invisible (or less visible) to human eyes.

The present embodiment discussed an example of a case in which the present invention is applied to the image forming apparatus (image data output processing apparatus) 10 in which an image in accordance with document image data is formed on a recording material. However, an application purpose of the present invention is not limited to this. For example, the present invention is applicable to an image reading apparatus including the image input apparatus 100 and the image processing apparatus 200. Alternatively, the present invention is applicable to an image data output processing apparatus which carries out image data output processes such as (i) an image transmission process in which the image input apparatus 100 transmits, via various networks (e.g., by facsimile and by scan-to-email) to another device, document image data which has been read from a document and then subjected to image processing carried out by the image processing apparatus 200, (ii) a filing process in which the document image data is stored in a given destination, and (iii) a display process in which an image in accordance with the document image data is displayed in a display device.

Note that each section (each block) of the image forming apparatus 10 illustrated in FIG. 3 can be made by a software in the above embodiment. In this case, the image forming apparatus 10 includes (i) a CPU (central processing unit) which executes a command from a control program that implements each function of the image forming apparatus 10, (ii) a ROM (read only memory) in which the program is stored, (iii) a RAM (random access memory) which unfolds the program, (iv) a storage device (a recording medium) such as a memory in which the program and various sets of data are stored, and (v) the like. A recording medium in which program codes (an executable program, an intermediate code program, and a source program) of the control program of the image forming apparatus 10 which is a software that implements the each function of the image forming apparatus 10 are computer-readably recorded is supplied to the image forming apparatus 10, so that a computer (or a CPU or an MPU) of the image forming apparatus 10 reads out and implements the program codes recorded in the recording medium. The object of the present invention is thus attained.

Examples of the recording medium include (i) tapes such as a magnetic tape and a cassette tape, (ii) disks including magnetic disks such as a Floppy (Registered Trademark) disk and a hard disk, and optical disks such as a CD-ROM, an MO, an MD, a DVD, and a CD-R, (iii) cards such as an IC card (including a memory card) and an optical card, and (iv) semiconductor memories realized by a mask ROM, EPROM, EEPROM, a flash ROM, and the like.

The image forming apparatus 10 can be connected to a communication network, via which the program codes can be supplied to the image forming apparatus 10. Such a communication network is not particularly limited. Examples of the communication network includes the Internet, an intranet, an extranet, a LAN, ISDN, VAN, a CATV communications network, a virtual private network, a telephone network, a mobile telecommunications network, and a satellite communication network. A transmission medium of which a communication network is composed is not particularly limited. Examples of the transmission medium includes wired transmission mediums such as IEEE1394, a USB, a power-line carrier, a cable TV circuit, a telephone line, and ADSL and wireless transmission mediums such as infrared communication systems such as IrDA and a remote controller, Bluetooth (Registered Trademark), 802.11 wireless communication system, HDR, a mobile phone network, a satellite circuit, and a digital terrestrial network. Note that the present invention can also be realized in a form of a computer data signal in which the program codes are embodied by an electronic transmission and which is embedded in carrier waves.

Note also that the each block of the image forming apparatus 10 can be made not only by a software but also by a hardware logic or by a combination of (i) a hardware which carries out a part of processes and (ii) calculation means which executes a software for carrying out (a) control of the hardware and (b) the remaining processes.

As specifically described in the present embodiment, an image reading apparatus of the present invention includes: (i) a light source section which directs light to a document, the light having a visible wavelength and an infrared wavelength; (ii) a light receiving section which receives the light reflected from the document and converts the reflected light to an electric signal, so as to prepare document image data that is image data of the document; (iii) a visible light cut filter which blocks light having the visible wavelength; (iv) a filter moving section which moves the visible light cut filter by changing states in which (a) the visible light cut filter is provided in an optical path in which the light is directed from the light source section to the document, reflected from the document, and then received by the light receiving section and (b) no visible light cut filter is provided in the optical path; (v) a color correction section which corrects a color of an image in the document image data; and a control section which controls operations of the respective sections (i) through (v) so that an infrared light scanning process, a visible light scanning process, and a color correction process are carried out, the infrared light scanning process being a process in which the light is directed from the light source section to at least a part of the document in a state in which the visible light cut filter is provided in the optical path, so that the light receiving section receives the reflected light from the document and prepares first image data which is document image data that corresponds to a result of receiving, by the light receiving section, light having the infrared wavelength, the visible light scanning process being a process in which the light is directed from the light source section to the document in a state in which no visible light cut filter is provided in the optical path, so that the light receiving section receives the reflected light from the document and prepares second image data which is document image data that corresponds to a result of receiving, by the light receiving section, light having the visible wavelength and light having the infrared wavelength, and the color correction process being a process in which the color correction section corrects a color of an image in the second image data in accordance with the first image data so as to remove or reduce, from the second image data, an influence of the light having the infrared wavelength.

According to the arrangement, the image reading apparatus includes (iii) a visible light cut filter which blocks light having the visible wavelength; (iv) a filter moving section which moves the visible light cut filter by changing states in which (a) the visible light cut filter is provided in an optical path in which the light is directed from the light source section to the document, reflected from the document, and then received by the light receiving section and (b) no visible light cut filter is provided in the optical path; (v) a color correction section which corrects a color of an image in the document image data. The control section controls operations of the respective sections (i) through (v) so that an infrared light scanning process, a visible light scanning process, and a color correction process are carried out, the infrared light scanning process being a process in which the light is directed from the light source section to at least a part of the document in a state in which the visible light cut filter is provided in the optical path, so that the light receiving section receives the reflected light from the document and prepares first image data which is document image data that corresponds to a result of receiving, by the light receiving section, light having the infrared wavelength, the visible light scanning process being a process in which the light is directed from the light source section to the document in a state in which no visible light cut filter is provided in the optical path, so that the light receiving section receives the reflected light from the document and prepares second image data which is document image data that corresponds to a result of receiving, by the light receiving section, light having the visible wavelength and light having the infrared wavelength, and the color correction process being a process in which the color correction section corrects a color of an image in the second image data in accordance with the first image data so as to remove or reduce, from the second image data, an influence of the light having the infrared wavelength. According to this, it is possible to remove, from visible light image data obtained by the visible light scanning process, an influence of light which has an infrared wavelength and is invisible (or less visible) to human eyes. Therefore, regardless of document paper types, document image data whose color tone is closer to a document color tone sensed by human eyes can be obtained.

The image reading apparatus of the present invention can be arranged such that the visible light cut filter blocks light having a wavelength of not more than a given transmission lower limit falling within a range of 700 nm to 800 nm, and the visible light cut filter causes light having a wavelength of more than the transmission lower limit to pass through the visible light cut filter.

There are variations among individuals in upper limit of a wavelength which is visible to human eyes. The upper limit falls within a range of approximately 700 nm to 800 nm. Therefore, according to the arrangement, it is possible to suitably remove, from visible light image data obtained by the visible light scanning process, an influence of light which has an infrared wavelength and is invisible (or less visible) to human eyes.

The image reading apparatus of the present invention can be arranged such that in the infrared light scanning process, the control section causes the light source section to direct the light to only a part of the document, so that document image data corresponding to the part of the document is prepared as the first image data.

In general, a reflection characteristic of near-infrared light due to a document depends on a paper type of the document and hardly depends on a color material from which an image on the document is formed. Therefore, according to the arrangement in which the first image data is prepared in accordance with a result obtained by directing the light to only a part of the document, it is possible to suitably remove, from visible light image data obtained by the visible light scanning process, an influence of light which has an infrared wavelength and is invisible (or less visible) to human eyes. Further, according to the arrangement, (i) the infrared light scanning process and the color correction process can be carried out in a shorter time and (ii) the color correction process can be carried out with a lighter calculation load, as compared to an arrangement in which the first image data is prepared in accordance with a result obtained by directing the light to the whole of the document.

The image reading apparatus of the present invention can be arranged such that: the light receiving section includes a plurality of light receiving elements which have respective peak light receiving sensitivities at different wavelengths, and in accordance with electric signals to which the reflected light received by each of the plurality of light receiving elements has been converted, the light receiving section prepares document image data of a plurality of color components corresponding to the respective plurality of light receiving elements; and in the color correction process, the color correction section calculates averages of respective color component pixel values of each pixel in the first image data, so as to subtract the averages from respective color component pixel values of each pixel in the second image data.

In a case where a plurality of light receiving elements which have respective peak light receiving sensitivities at different wavelengths are provided, the plurality of light receiving elements generally have their respective sensitivity characteristics to light in the infrared wavelength region. In contrast, according to the arrangement, the second image data can be suitably corrected in accordance with sensitivity characteristics of the respective light receiving elements to the light in the infrared wavelength region.

The image reading apparatus of the present invention can be arranged such that: the light receiving section includes (i) a red light receiving element which has a peak light receiving sensitivity in a wavelength region corresponding to red, (ii) a green light receiving element which has a peak light receiving sensitivity in a wavelength region corresponding to green, and (iii) a blue light receiving element which has a peak light receiving sensitivity in a wavelength region corresponding to blue, and in accordance with electric signals to which the reflected light received by each of the red, green, and blue light receiving elements has been converted, the light receiving section prepares document image data of red, green, and blue; and in the color correction process, the color correction section calculates an average of a red pixel value out of red, green, and blue pixel values of each pixel in the first image data, so as to subtract the average from a red pixel value of each pixel in the second image data.

In a case where red, green, and blue light receiving elements are provided, the red light receiving element generally has a higher sensitivity to light in the infrared wavelength region than the green and blue light receiving elements.

Therefore, according to the arrangement in which the red component which is most strongly influenced by light in the infrared wavelength region is corrected in the second image data, it is possible to suitably remove, from visible light image data obtained by the visible light scanning process, an influence of light which has an infrared wavelength and is invisible (or less visible) to human eyes. Further, the color correction according to the arrangement can be carried out with a lighter calculation load, as compared to an arrangement in which the red, green, and blue components are corrected.

An image data output processing apparatus of the present invention includes an image reading apparatus mentioned above, the image data output processing apparatus carrying out an output process with respect to the document image data which has been corrected by the image reading apparatus. Note that examples of the output process include: (i) a printing process in which an image in accordance with the image data is printed on a recording material, (ii) a display process in which an image in accordance with the image data is displayed in a display device, (iii) a transmission process in which the image data is transmitted to another device, and (iv) a filing process in which the image data is stored in a given destination.

According to the arrangement, regardless of document paper types, document image data whose color tone is closer to a document color tone sensed by human eyes can be obtained. In addition, an image whose color tone is closer to that of an original document can be outputted.

An image reading method of the present invention carried out in an image reading apparatus including a light source section which directs light to a document, the light having a visible wavelength and an infrared wavelength, and a light receiving section which receives the light reflected from the document and converts the reflected light to an electric signal, so as to prepare document image data that is image data of the document, the image reading method includes the steps of: (i) carrying out an infrared light scanning process in which the light is directed from the light source section to at least a part of the document in a state in which a visible light cut filter that blocks light having the visible wavelength is provided in an optical path, in which the light is directed from the light source section to the document, reflected from the document, and then received by the light receiving section, so that the light receiving section receives the reflected light from the document and prepares first image data which is document image data that corresponds to a result of receiving, by the light receiving section, light having the infrared wavelength; (ii) carrying out a visible light scanning process in which the light is directed from the light source section to the document in a state in which no visible light cut filter is provided in the optical path, so that the light receiving section receives the reflected light from the document and prepares second image data which is document image data that corresponds to a result of receiving, by the light receiving section, light having the visible wavelength and light having the infrared wavelength; and (iii) carrying out a color correction process in which a color of an image in the second image data is corrected in accordance with the first image data so that an influence of the light having the infrared wavelength is removed or reduced from the second image data.

According to the method, it is possible to remove, from visible light image data obtained by the visible light scanning process, an influence of light which has an infrared wavelength and is invisible (or less visible) to human eyes. Therefore, regardless of document paper types, document image data whose color tone is closer to a document color tone sensed by human eyes can be obtained.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to an image reading apparatus in which a document is read so as to obtain image data of the document.

REFERENCE SIGNS LIST

10 Image forming apparatus (Image reading apparatus, Image data output processing apparatus)
50 Scanner unit
51 Platen
62 Light Source (Light source section)
64 CCD element (Light receiving element, Light receiving section)
65 Visible light cut filter
100 Image input apparatus
102 Scanner control section
103 Light source control section
104 Scanning control section
105 Light receiving control section
106 Filter control section
200 Image processing apparatus
203 Segmentation process section
205 Color correction section
30 Image output apparatus (Image output section)
400 Control section

The invention claimed is:

1. An image reading apparatus comprising:
(i) a light source section which directs light to a document, the light having a visible wavelength and an infrared wavelength;
(ii) a light receiving section which receives the light reflected from the document and converts the reflected light to an electric signal, so as to prepare document image data that is image data of the document;
(iii) a visible light cut filter which blocks light having the visible wavelength;
(iv) a filter moving section which moves the visible light cut filter by changing states in which (a) the visible light cut filter is provided in an optical path in which the light is directed from the light source section to the document, reflected from the document, and then received by the light receiving section and (b) no visible light cut filter is provided in the optical path;
(v) a color correction section which corrects a color of an image in the document image data; and
(vi) a control section which controls operations of the respective sections (i) through (v) so that an infrared light scanning process, a visible light scanning process, and a color correction process are carried out,
the infrared light scanning process being a process in which the light is directed from the light source section to at least a part of the document in a state in which the visible light cut filter is provided in the optical path, so that the light receiving section receives the reflected light from the document and prepares first image data which is document image data that corresponds to a result of receiving, by the light receiving section, light having the infrared wavelength, the visible light scanning process being a process in which the light is directed from the light source section to the document in a state in which no visible light cut filter is provided in the optical path, so that the light receiving section receives the reflected light from the document and prepares second image data which is document image data that corresponds to a result of receiving, by the light receiving section, light having the visible wavelength and light having the infrared wavelength, and the color correction process being a process in which the color correction section corrects a color of an image in the second image data in accordance with the first image data so as to remove or reduce, from the second image data, an influence of the light having the infrared wavelength.

2. The image reading apparatus as set forth in claim 1, wherein the visible light cut filter blocks light having a wavelength of not more than a given transmission lower limit falling within a range of 700 nm to 800 nm, and the visible light cut filter causes light having a wavelength of more than the transmission lower limit to pass through the visible light cut filter.

3. The image reading apparatus as set forth in claim 1, wherein in the infrared light scanning process, the control section causes the light source section to direct the light to only a part of the document, so that document image data corresponding to the part of the document is prepared as the first image data.

4. The image reading apparatus as set forth in claim 1, wherein:

the light receiving section includes a plurality of light receiving elements which have respective peak light receiving sensitivities at different wavelengths, and in accordance with electric signals to which the reflected light received by each of the plurality of light receiving elements has been converted, the light receiving section prepares document image data of a plurality of color components corresponding to the respective plurality of light receiving elements; and in the color correction process, the color correction section calculates averages of respective color component pixel values of each pixel in the first image data, so as to subtract the averages from respective color component pixel values of each pixel in the second image data.

5. The image reading apparatus as set forth in claim 1, wherein:

the light receiving section includes (i) a red light receiving element which has a peak light receiving sensitivity in a wavelength region corresponding to red, (ii) a green light receiving element which has a peak light receiving sensitivity in a wavelength region corresponding to green, and (iii) a blue light receiving element which has a peak light receiving sensitivity in a wavelength region corresponding to blue, and in accordance with electric signals to which the reflected light received by each of the red, green, and blue light receiving elements has been converted, the light receiving section prepares document image data of red, green, and blue; and in the color correction process, the color correction section calculates an average of a red pixel value out of red, green, and blue pixel values of each pixel in the first image data, so as to subtract the average from a red pixel value of each pixel in the second image data.

6. An image data output processing apparatus comprising:
an image reading apparatus recited in claim 1,
the image data output processing apparatus carrying out an output process with respect to the document image data which has been corrected by the image reading apparatus.

7. An image reading method carried out in an image reading apparatus including a light source section which directs light to a document, the light having a visible wavelength and an infrared wavelength, and a light receiving section which receives the light reflected from the document and converts the reflected light to an electric signal, so as to prepare document image data that is image data of the document, said image reading method comprising the steps of:

(i) carrying out an infrared light scanning process in which the light is directed from the light source section to at least a part of the document in a state in which a visible light cut filter that blocks light having the visible wavelength is provided in an optical path, in which the light is directed from the light source section to the document, reflected from the document, and then received by the light receiving section, so that the light receiving section receives the reflected light from the document and prepares first image data which is document image data that corresponds to a result of receiving, by the light receiving section, light having the infrared wavelength;

(ii) carrying out a visible light scanning process in which the light is directed from the light source section to the document in a state in which no visible light cut filter is provided in the optical path, so that the light receiving section receives the reflected light from the document and prepares second image data which is document image data that corresponds to a result of receiving, by the light receiving section, light having the visible wavelength and light having the infrared wavelength; and (iii) carrying out a color correction process in which a color of an image in the second image data is corrected in accordance with the first image data so that an influence of the light having the infrared wavelength is removed or reduced from the second image data.

* * * * *